United States Patent
Yao et al.

(10) Patent No.: US 8,932,453 B2
(45) Date of Patent: Jan. 13, 2015

(54) HYDROPROCESSING PROCESS WITH IMPROVED CATALYST ACTIVITY

(75) Inventors: Jianhua Yao, Bartlesville, OK (US); Dhananjay B. Ghonasgi, Bartlesville, OK (US); Xiaochun Xu, Bartlesville, OK (US); Larry D. Swinney, Stillwater, OK (US)

(73) Assignee: Phillips 66 Company, Houston, TX (US)

( * ) Notice: Subject to any disclaimer, the term of this patent is extended or adjusted under 35 U.S.C. 154(b) by 850 days.

(21) Appl. No.: 13/150,863

(22) Filed: Jun. 1, 2011

(65) Prior Publication Data

US 2012/0017496 A1 Jan. 26, 2012

Related U.S. Application Data

(60) Provisional application No. 61/367,147, filed on Jul. 23, 2010.

(51) Int. Cl.
| | | |
|---|---|---|
| *C10G 47/36* | (2006.01) | |
| *C10G 49/26* | (2006.01) | |
| *C10G 47/32* | (2006.01) | |
| *B01J 38/04* | (2006.01) | |
| *B01J 23/96* | (2006.01) | |
| *C10G 3/00* | (2006.01) | |
| *C10G 45/08* | (2006.01) | |

(52) U.S. Cl.
CPC *B01J 38/04* (2013.01); *B01J 23/96* (2013.01); *C10G 3/46* (2013.01); *C10G 45/08* (2013.01); *C10G 3/45* (2013.01); *C10G 3/47* (2013.01); *C10G 3/50* (2013.01); *C10G 2300/202* (2013.01); *C10G 2300/703* (2013.01); *C10G 2300/1014* (2013.01); *C10G 2300/1018* (2013.01); *C10G 2300/1022* (2013.01); *C10G 2300/104* (2013.01); *C10G 2300/1044* (2013.01); *C10G 2300/1051* (2013.01); *C10G 2300/1055* (2013.01); *C10G 2300/1059* (2013.01)
USPC ............... 208/108; 208/111.3; 208/209

(58) Field of Classification Search
CPC .. B01J 23/96; B01J 38/04; C10G 2300/1014; C10G 2300/1018; C10G 2300/1022; C10G 2300/104; C10G 2300/1044; C10G 2300/1051; C10G 2300/1055; C10G 2300/1059; C10G 2300/202; C10G 2300/703; C10G 3/04
USPC ......... 208/107–110, 111.3, 111.35, 134, 143, 208/209, 216 R, 217
See application file for complete search history.

(56) References Cited

U.S. PATENT DOCUMENTS

| | | |
|---|---|---|
| 3,719,588 A | 3/1973 | Vernon et al. |
| 4,011,153 A | 3/1977 | Fu |
| 4,381,993 A | 5/1983 | Nevitt |
| 7,074,735 B2 | 7/2006 | Brignac et al. |
| 2006/0231464 A1 | 10/2006 | Brignac et al. |

*Primary Examiner* — Walter D Griffin
*Assistant Examiner* — Derek Mueller
(74) *Attorney, Agent, or Firm* — Phillips 66 Company

(57) ABSTRACT

This invention relates to a hydroprocessing process with improved catalyst activity when hydroprocessing petroleum based feedstock or an oxygen containing feedstock. This invention also relates to a hydrotreating process with improved hydrodesulfurization (HDS) activity of a hydrotreating catalyst such as Co/Mo by co-feeding carbon monoxide or its precursors. Such inventive process confirms that adding a small amount of CO to H2 in a hydrotreater for a few days leads to an increase in product sulfur due to the inhibition of CO on the hydrotreating catalyst such as Co/Mo. However, it has been unexpectedly found that after the CO was removed from the hydrogen stream, product sulfur levels decreased to values below they were before CO addition which means the activity of the hydrotreating catalyst increased after the CO treatment.

24 Claims, No Drawings ured the source stream, product sulfur levels
HYDROPROCESSING PROCESS WITH IMPROVED CATALYST ACTIVITY

CROSS-REFERENCE TO RELATED APPLICATIONS

This application is a non-provisional application which claims benefit under 35 USC §119(e) to U.S. Provisional Application Ser. No. 61/367,147 filed Jul. 23, 2010, entitled "HYDROPROCESSING PROCESS WITH IMPROVED CATALYST ACTIVITY," which is incorporated herein in its entirety.

STATEMENT REGARDING FEDERALLY SPONSORED RESEARCH OR DEVELOPMENT

None.

FIELD OF THE DISCLOSURE

This invention relates to a hydroprocessing process with improved catalyst activity. This invention also relates to a hydrotreating process with improved hydrodesulfurization (HDS) activity of a hydrotreating catalyst by co-feeding carbon monoxide.

BACKGROUND OF THE DISCLOSURE

Hydroprocessing in general refers to a process of contacting a feedstock with hydrogen at an elevated temperature and pressure using catalyst which may vary according to the types of the feedstock, the purpose and the condition of the process.

A classic example of hydroprocessing is the so called hydrotreating process, which refers to a process of contacting a petroleum feedstock with hydrogen at an elevated temperature and pressure using hydrotreating catalyst to, for example, remove or lower the sulfur contaminant from the feedstock. Hydrotreating itself can have different purposes and conditions such as but not limited to hydrogenation, hydrodesulfurization and hydrodenitrogenation, hydrodeoxygenation, and aromatics saturation.

In recent years, laboratory and commercial tests have demonstrated that vegetable oils and/or animal fats can be added to a refinery hydrotreater to produce transportation fuels. However, unlike the petroleum based feedstock, it is found that carbon monoxide and carbon dioxide can be generated in the process of hydrotreating vegetable oils and/or animal fats.

Since it is well known in the literature (Topics in Catalysis (2009) 52:229-240, Bjorn Donnis et al.) that co-feeding CO or CO2 with $H_2$ inhibits sulfur removal, it is therefore highly desirable to 1) understand the impact of the CO and CO2 generated from the process of hydrotreating vegetable oils and/or animal fat oil on catalyst activity, and 2) improve the process and catalyst for hydroprocessing vegetable oils and/or animal fat oil including improving the activity of the hydroprocessing catalyst.

BRIEF SUMMARY OF THE DISCLOSURE

This invention relates to a hydroprocessing process with improved catalyst activity when hydroprocessing petroleum based feedstock or an oxygen containing feedstock. This invention also relates to a hydrotreating process with improved hydrodesulfurization (HDS) activity of a hydrotreating catalyst such as Co/Mo by co-feeding carbon monoxide or its precursors. Such inventive process confirms that adding a small amount of CO to H2 in a hydrotreater for a few days leads to an increase in product sulfur due to the inhibition of CO on the hydrotreating catalyst such as Co/Mo. However, it has been unexpectedly found that after the CO was removed from the hydrogen stream, product sulfur levels decreased to values below they were before CO addition which means the activity of the hydrotreating catalyst increased after the CO treatment.

In one embodiment of the current invention, a process is provided comprising a) contacting a petroleum based hydrocarbon feedstock with a hydroprocessing catalyst in a hydroprocessing reactor under hydroprocessing conditions; b) feeding a co-feed stream to the hydroprocessing reactor for a reaction time period X; and c) removing the co-feed for a time period Y. In this process, the activity of the hydroprocessing catalyst after the step c is higher than the activity of the hydroprocessing catalyst in step a.

In another embodiment of the current invention, a process is provided comprising a) contacting an oxygen containing feedstock with a hydroprocessing catalyst in a hydroprocessing reactor under hydroprocessing conditions; b) feeding a co-feed stream to the hydroprocessing reactor for a reaction time period X; and c) removing the co-feed for a time period Y. In this process, the activity of the hydroprocessing catalyst after the step c is higher than the activity of the hydroprocessing catalyst in step a.

BRIEF DESCRIPTION OF THE DRAWINGS

None.

DETAILED DESCRIPTION OF THE DISCLOSURE

This invention relates to a hydroprocessing process with improved catalyst activity when hydroprocessing petroleum based feedstock or an oxygen containing feedstock. This invention also relates to a hydrotreating process with improved hydrodesulfurization (HDS) activity of a hydrotreating catalyst such as Co/Mo by co-feeding carbon monoxide or its precursors. Such inventive process confirms that adding a small amount of CO to H2 in a hydrotreater for a few days leads to an increase in product sulfur due to the inhibition of CO on the hydrotreating catalyst such as Co/Mo. However, it has been unexpectedly found that after the CO was removed from the hydrogen stream, product sulfur levels decreased to values below they were before CO addition which means the activity of the hydrotreating catalyst increased after the CO treatment.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

According to the first embodiment of the current invention, there is provided a process for hydroprocessing a petroleum based hydrocarbon feedstock to make fuel product by contacting the petroleum based hydrocarbon with hydroprocessing catalyst under hydroprocessing conditions with intermittent or discontinuous addition of a co-feed stream. The co-feed stream refers to CO, CO2, or their precursors.

According to the $2^{nd}$ embodiment of the current invention, there is provided a process for hydroprocessing an oxygen containing feedstock to make fuel product by contacting the oxygen containing feedstock with hydroprocessing catalyst under hydroprocessing conditions with intermittent or discontinuous addition of a co-feed stream. The co-feed stream refers to CO, CO2, or their precursors.

The term "hydroprocessing" in general refers to a process for contacting a feedstock with a treating gas at an elevated temperature and pressure using catalyst which may vary according to the types of the feedstock, the purpose and the condition of the process. Hydroprocessing conditions include temperatures in the range from about 250 to about 800° F. and pressure in the range from about 100 psig to about 2500 psig.

Hydroprocessing in general is carried out in the presence of a catalytically effective amount of hydroprocessing catalyst containing metals. Such catalysts generally involve a carrier such as a refractory inorganic oxide having deposited thereon a metal that may be selected from Groups 3-10 of the Periodic Table based on the IUPAC format having Groups 1-18. According to one embodiment of the invention, the metal is selected from Groups 3-10. According to another embodiment, the metal is selected from Groups 6 and 8-10 including but not limited to Mo, W, Ni, Co, and Ru. Unsupported hydroprocessing catalysts can also be used in hydroprocessing process.

Commercial hydroprocessing catalysts are readily available from a variety of sources including ALBEMARLE, ADVANCED REFINING TECHNOLOGIES (ART), PGM CATALYSTS & CHEMICALS, AMERICAN ELEMENTS, EURECAT, FISCHER, HALDOR TOPSOE, HEADWATER, SIGMA, and other chemical suppliers. Catalysts may be microsized, nanosized, fluidized or other catalyst forms dependent upon the reactor size, shape and conditions under which the reaction is run.

The term hydroprocessing includes but not limited to hydrotreating, hydrocracking, and any process in which a hydrocarbon feed is reacted with a treating gas (e.g. hydrogen for hydrotreating process).

Hydrotreating process refers to a process of contacting a petroleum feedstock or oxygen containing feedstock with hydrogen at an elevated temperature and pressure using hydrotreating catalyst to, for example, remove or lower the sulfur contaminant from the feedstock. Hydrotreating itself can have different purposes and conditions such as hydrogenation, and hydrodesulfurization (HDS), hydrodenitrogenation (HDN), hydrodeoxygenation (HDO) and aromatics saturation.

Hydrotreating process conditions include temperatures in the range from about 250 to about 800° F., pressure in the range from about 100 psig to about 2500 psig. The hydrogen treat gas rate in the range of about 100 to 10,000 scf/B (standard cubic feed gas per barrel of liquid and a liquid hourly space velocity in the range of about 0.1 to about 10 hr.$^{-1}$.

The hydrotreating process in general is carried out in the presence of catalyst containing at least one metal from Groups 6, 8, 9 and 10 of the Periodic Table, based on the IUPAC format having Groups 1-18. In one embodiment, such catalysts include Co, Mo, Ni, W, and Ru. In the case of hydrogenation, hydrodesulfurization (HDS), hydrodenitrogenation (HDN), hydrodeoxygenation (HDO), and aromatics saturation, such catalysts contain Co, Mo, Ni, W, and mixtures thereof such as Co/Mo, Ni/Mo, Ni/W and Ni/Mo/W. These catalysts are usually supported on a refractory inorganic oxide support such as alumina, silica, silica-alumina and the like. Unsupported hydroprocessing catalysts can also be used in hydroprocessing processes.

Another example of hydroprocessing is the so called hydrocracking process, which refers to a process of contacting a petroleum based or oxygen containing feedstock with hydrogen at an elevated temperature and pressure using hydrocracking catalyst, for example, NiW on Al2O3-Si02. Hydrocracking can include several reactions such as hydrocracking, hydrodesulfurization (HDS), hydrodenitrogenation (HDN), hydrodeoxygenation (HDO) and aromatics saturation.

Hydrocracking process conditions include temperatures in the range from about 500 to about 900° F., pressures in the range from about 100 to about 4000 psig, hydrogen treat gas rate in the range of about 100 to 10,000 scf/B and a liquid hourly space velocity in the range of about 0.1 to about 10 hr$^{-1}$.

Hydrocracking catalysts include an acid support serving as cracking component and a hydrogenation component. The cracking component may be amorphous or crystalline. Amorphous cracking catalysts include silica-alumina. Crystalline cracking catalysts are molecular sieves including aluminosilicates such as zeolites and aluminophosphates such as SAPOs. Examples of zeolites as cracking catalysts include Y zeolite, beta zeolite and ZSM-5 Examples of SAPOs as cracking catalysts include SAPO-5, SAPO-34. Hydrogenation components include Group 6 or Group 8-10 metals or oxides include but not limited to one or more of molybdenum, tungsten, cobalt, nickel, or the oxides thereof.

Referring to the 1st embodiment of the invention, the petroleum based hydrocarbon useful for the invention includes but not limited to a full range of feeds from paraffins and light virgin naphthas to whole crudes and include both natural and synthetic feeds. Boiling points for feeds may range from about 100 to greater than about 1000° F. Examples of such feeds include C5+ paraffins, naphthas, kerosene, gasoline, heating oils, jet fuels, diesel, cycle oils, catalytically cracked light and heavy gas oils, hydrotreated gas oil, light flash distillate, vacuum gas oil, light gas oil, straight run gas oil, coker gas oil, synthetic gas oil, deasphalted oils, foots oil, slack waxes, waxes obtained from a Fischer-Tropsch synthesis process, long and short residues, and syncrudes, optionally originating from tar sand, shale oils, residue upgrading processes and etc, Referring to the $2^{nd}$ embodiments of the invention, the oxygen containing feedstock refers to any feed molecules containing oxygen atoms. The oxygen containing feedstock useful for the invention includes but not limited to vegetable oil, animal fats, algae oil, glycols, polyols, sugar alcohols, biomass, and organic compounds containing functional groups that can be reduced (hydrogenated) such as aldehydes, ketones, esters, amides and carboxylic acids. In general, any oxygen containing feedstock may undergo the reactions, such as decarbonylation and decarboxylation to produce carbon monoxide and carbon dioxide, respectively, while undergoing a hydroprocessing process.

Refer to the $1^{st}$ and $2^{nd}$ embodiments of the invention, the co-feed stream useful for the current invention includes but not limited to CO or its precursors. A CO or its precursors is a compound which releases CO under hydroprocessing conditions. Examples of such CO generating precursors include carboxylic acids, carbonates, formaldehyde, glyoxal, and carbonyls. Since the oxygen containing feedstock may undergo reactions during hydroprocessing, such as decarbonylation and decarboxylation to produce carbon monoxide and carbon dioxide, respectively, therefore, any oxygen containing feedstocks, such as vegetable oil, animal fats, algae oil, glycols, polyols, sugar alcohols can also serve as CO or its precursors.

Further referring to the $1^{st}$ and $2^{nd}$ embodiment of the invention, the feedstock may be contacted with a hydroprocessing catalyst under hydroprocessing conditions including treating gas such as hydrogen. A co-feed stream may be added to the treating gas or directly to the hydroprocessing reactor. Any hydroprocessing reactor known to the people skilled in the art may be used for this invention.

The co-feed stream may be added to the hydroprocessing reactor for a time period X, which is from the time when the addition of co-feed stream step starts to the time when the activity of the hydroprocessing catalyst is at least 3% lower than which was prior to the addition of co-feed stream. In one embodiment of the current invention, such reaction time period X is 0.1 to 30 days. In another embodiment of the current invention, such reaction time period X is 0.5 to 20 days.

The co-feed stream may then be removed for a time period Y, which is from the time when the removing of the co-feed stream step starts to the time when the activity of the hydroprocessing catalyst is at least 3% higher than which was prior to the addition of co-feed stream step. In one embodiment of the current invention, such time period Y is 0.1 to 5 days. In another embodiment of the current invention, such time period Y is 0.3 to 3 days.

The following examples of certain embodiments of the invention are given. Each example is provided by way of explanation of the invention, one of many embodiments of the invention, and the following examples should not be read to limit, or define, the scope of the invention.

Laboratory and commercial tests have demonstrated that vegetable oils and/or animal fats can be added to a refinery hydrotreater to produce transportation fuels. Since carbon monoxide and carbon dioxide can be generated from oxygen containing feedstocks such as animal fat and vegetable oils in this hydrotreating process, experiments were run to study the effects that CO would have on the performance of a commercially available cobalt/molybdenum catalyst.

Bench scale experiments have been performed on the effects of co-feeding a small amount of CO with $H_2$ during a hydrotreating run. All tests were run on a laboratory hydrotreater using a 2000 ppm sulfur containing feed. The hydrotreating conditions were set as listed in the following tables with respective examples. The catalyst performance was evaluated based on the product sulfur level.

EXAMPLE 1

In this test as shown in the following Table 1, the feed was hydrotreated at 339° C., 600 psig, 1.0 hr$^{-1}$, and 1400 scf/b to give product sulfur of 21.3 ppm. When hydrogen was replaced by 1% CO/$H_2$, the sulfur increased to 78 ppm. When CO was removed after 6 days, sulfur in product was 19 ppm. This experiment result suggested that co-feeding CO with H2 for a few days can improve the HDS activity of Co/Mo catalyst.

TABLE 1

| Process conditions | Product S, ppm |
| --- | --- |
| Step 1: Step 1: Base case: 339° C., 600 psig, 1.0 hr–1 and 1400 scf/b | 21.3 ppm |
| Step 2: Added 1% water to the diesel feed for 10 days, kept other conditions same as base case. Replaced H2 with 1% CO/H2 mixture for 6 days, kept other conditions same as base case. | 78 ppm |
| Step 3: Removed CO and water from the feed, kept other conditions same as based case. The product S level after this step is lower than the base case product S level in Step 1. | 19 ppm |

EXAMPLE 2

In this test as shown in the following Table 2, the feed was hydrotreated at 346° C., 600 psig, 1.0 hr$^{-1}$, and 1400 scf/b to give a product sulfur level of 11 ppm. After treatment with 0.5% CO/$H_2$, product sulfur increased to 39 ppm. When CO was removed after 17 days, sulfur in product was 8.6 ppm. This experiment result suggested that co-feeding CO with H2 for a few days can improve the HDS activity of Co/Mo catalyst.

TABLE 2

| Process conditions | Product S, ppm |
| --- | --- |
| Step 1: Step 1: Base case: 346 C, 600 psig, 1.0 hr–1 and 1400 scf/b | 11 ppm |
| Step 2: Added 1% water to the diesel feed for 10 days, kept other conditions same as base case | 12 ppm |
| Step 3: Added 1% water to the diesel feed and 0.5% CO to hydrogen for 14 days, kept other conditions same as based case | 39 ppm |
| Step 4: Removed water from diesel feed and kept 0.5% CO in H2 for additional 3 days, Other conditions were same as base case. | 37 ppm |
| Step 5: Back to base case. No H2O and no CO Base case product S level in Step 5 is lower than the base case product S level in Step 1 | 8.6 ppm |

EXAMPLE 3

In this test as shown in the following Table 3, the feed was hydrotreated at 346° C., 600 psig, 1.0 hr$^{-1}$, and 1400 scf/b to give a product sulfur level of 12 ppm. After treatment with steam, sulfur level was at 16 ppm. When the water addition was removed, sulfur in product was 13 ppm. This experiment result suggested that feeding steam had essentially no effect on the catalyst activity.

TABLE 3

| Process conditions | Product S, ppm |
| --- | --- |
| Step 1: Base case: 346° C., 600 psig, 1.0 hr–1 and 1400 scf/b | 12 ppm |
| Step 2: Added 3% water to the diesel feed for 19 days, kept other conditions same as base case | 16 ppm |
| Step 3: Back to base case, no water addition | 13 ppm |

These bench scale tests confirm the result that a small amount of CO added to $H_2$ in a lab hydrotreater (Co/Mo catalyst) for a few days leads to an increase in product sulfur due to the inhibition of CO. However, what is unexpected is that after the CO was removed from the hydrogen stream, product sulfur levels decreased to values below they were before CO addition. In other words, the hydrotreating catalyst exhibited better HDS activity than the HDS activity prior to CO addition. Using a feed with about 2000 ppm sulfur, these tests demonstrated the decrease in product sulfur after CO treatment. This suggests that co-feeding CO with H2 for a few days can improve the HDS activity of Co/Mo catalyst as illustrated in the examples above. These bench scale tests also demonstrated that having steam in the feed, with or without CO, had essentially no effect on catalyst activity.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A process comprising
   a) contacting a feedstock comprising a petroleum based hydrocarbon feedstock with a hydroprocessing catalyst in a hydroprocessing reactor under a hydroprocessing condition to produce diesel and/or jet fuel with low sulfur content for a base production period of time until the sulfur content in the diesel and/or jet fuel becomes unsatisfactorily high;
   b) at a time when the sulfur content of the produced diesel and/or jet fuel becomes unsatisfactorily high, feeding a co-feed stream to said hydroprocessing reactor for a reaction time period X wherein the co-feed stream comprises CO or a precursor to CO and water or a precursor to water; and
   c) removing said co-feed for a time period Y,
   wherein the activity of said hydroprocessing catalyst after said step (c) is higher than the activity of said hydroprocessing catalyst in step (a) as measured by the sulfur content of the produced diesel or jet fuel.

2. The process of claim 1 wherein said petroleum based hydrocarbon feedstock is selected from a group consisting C5+ paraffins, naphthas, kerosene, gasoline, heating oils, jet fuels, diesel, cycle oils, catalytically cracked light and heavy gas oils, hydrotreated gas oil, light flash distillate, vacuum gas oil, light gas oil, straight run gas oil, coker gas oil, synthetic gas oil, deasphalted oils, foots oil, slack waxes, waxes obtained from a Fischer-Tropsch synthesis process, long and short residues, syncrudes, optionally originating from tar sand, shale oils, residue upgrading processes, and any mixture thereof.

3. The process of claim 1 wherein the water precursor comprises any molecules containing oxygen atoms.

4. The process of claim 3 wherein said water precursors are selected from a group consisting of vegetable oil, animal fat, algae oil, glycols, polyols, sugar alcohols, biomass, organic compounds, and any mixture thereof.

5. The process of claim 4 wherein said biomass and organic compound contains functional groups which can be reduced or hydrogenated.

6. The process of claim 1,
   wherein said reaction time period X is at least from the time when the step (b) starts to the time when the activity of said hydroprocessing catalyst is at least 10% lower than which was prior to step (b), and
   wherein said time period Y is at least from the time when the step (c) starts to the time when the activity of said hydroprocessing catalyst is at least 10% higher than which was in step (a).

7. The process of claim 1 wherein said reaction time period X is 0.1 to 30 days and said time period Y is in the range from 0.1 to 5 days.

8. The process of claim 1 wherein said reaction time period X is 0.5 to 20 days and said time period Y is in the range from 0.3 to 3 days.

9. The process of claim 1 wherein said CO precursor is a compound which releases CO under said hydroprocessing condition.

10. The process of claim 9 wherein said CO precursor is selected from a group consisting of carbon dioxide, carboxylic acids, carbonates, formaldehyde, glyoxalin, carbonyls, vegetable oil, animal fat, algae oil, glycols, polyols, sugar alcohols, and any mixture thereof.

11. The process of claim 1 wherein said hydroprocessing catalyst is a metal-containing hydroprocessing catalyst.

12. The process of claim 11 wherein said metal is selected from Groups 3-10 of the Periodic Table.

13. The process of claim 11 wherein said metal is selected from a group consisting of Mo, W, Ni, Co, Ru, and any mixture thereof.

14. The process of claim 1 wherein said hydroprocessing catalyst is supported on an inorganic oxide support.

15. The process of claims 1 wherein said hydroprocessing condition comprises a temperature in the range from about 250 to about 800° F. and a pressure in the range from about 100 to 2500 psig.

16. The process of claims 1 wherein said hydroprocessing process is a hydrotreating process carried out by a hydrotreating catalyst under a hydrotreating condition.

17. The process of claim 16 wherein said hydrotreating condition comprises a temperature in the range from about 250 to about 800° F. and a pressure in the range from about 100 to 4000 psig.

18. The process of claim 16 wherein said hydrotreating catalyst is selected from a group consisting of Co, Mo, Ni, W, and mixtures thereof.

19. The process of claim 16 wherein said hydrotreating process is in addition to being a desulfurizing process, is a hydrogenation process, a hydrodenitrogenation process, a hydrodeoxygenation process or an aromatics saturation process.

20. The process of claim 1 wherein said hydroprocessing process is a hydrocracking process carried out by a hydrocracking catalyst under a hydrocracking condition.

21. The process of claim 20 wherein said hydrocracking catalyst is selected from a group consisting of Co, Mo, Ni, W and any combination thereof.

22. The process of claim 20 wherein hydrocracking condition comprises a temperature in the range from about 500 to about 900° F. and a pressure in the range from about 100 to 4000 psig.

23. A process for improving the hydro-desulfurizing of hydrocarbons for the production of diesel and/or jet fuel wherein the hydrocarbons are subjected to hydrogen and hydro-desulfurizing catalyst in a reactor at elevated temperature and pressure conditions suitable for hydro-desulfurizing, wherein the process comprises:
   (a) operating the reactor at hydro-desulfurizing conditions and feeding hydrogen and hydrocarbons for production of diesel and/or jet fuel for a base production operation until the sulfur content of the hydrocarbons exiting the reactor becomes elevated to an unsatisfactory level;
   (b) adding water and carbon monoxide to the reactor in a co-feed operation for a reaction period of time during which the sulfur content of the hydrocarbons exiting the reactor may increase above the unsatisfactory level attained in step (a); and
   (c) terminating the addition of the carbon monoxide and water as a co-feed in step (b) after the reaction period of time and returning to the conditions of the base production operation established in step (a), but after a reaction period of time under the co-feed conditions established in step (b) to obtain product with lower sulfur content than obtained immediately prior to the reaction period of time under the same conditions.

24. The process of claim 23 wherein the water and the carbon monoxide are essentially the only additional co-fed materials between steps (a) and (c).

* * * * *